United States Patent
Larsson et al.

(10) Patent No.: US 9,096,213 B2
(45) Date of Patent: Aug. 4, 2015

(54) SYSTEM AND METHOD FOR OPERATING AN ENGINE OF A VEHICLE

(75) Inventors: Lena Larsson, Västra Frölunda (SE); Anders Eriksson, Torslanda (SE); Jan Öberg, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 163 days.

(21) Appl. No.: 14/110,147

(22) PCT Filed: Apr. 5, 2011

(86) PCT No.: PCT/SE2011/000064
§ 371 (c)(1),
(2), (4) Date: Dec. 2, 2013

(87) PCT Pub. No.: WO2012/138263
PCT Pub. Date: Oct. 11, 2012

(65) Prior Publication Data
US 2014/0324305 A1 Oct. 30, 2014

(51) Int. Cl.
*B60W 10/06* (2006.01)
*B60W 10/02* (2006.01)
(Continued)

(52) U.S. Cl.
CPC ............... *B60W 10/06* (2013.01); *B60W 10/02* (2013.01); *B60W 10/11* (2013.01); *B60W 30/18072* (2013.01); *F16H 61/0213* (2013.01); *B60W 10/10* (2013.01); *B60W 30/18027* (2013.01); *B60W 2030/1809* (2013.01); *B60W 2710/0627* (2013.01); *B60W 2710/1005* (2013.01);
(Continued)

(58) Field of Classification Search
CPC ................ B60W 10/06; B60W 10/10; B60W 30/18072; B60W 30/18027; F16H 61/0213; F16H 2061/023; Y10T 477/688
USPC ............................... 701/54, 60; 477/115, 903
See application file for complete search history.

(56) References Cited

U.S. PATENT DOCUMENTS 6,095,945 A * 8/2000 Graf .............................. 477/97
2005/0014605 A1 1/2005 Ries-Mueller
(Continued)

FOREIGN PATENT DOCUMENTS

DE  102005003608 A1  8/2006
DE  10 007012875 A1  9/2008
(Continued)

OTHER PUBLICATIONS

English translation of DE102005003608A, May 12, 2015, tranlationportal.epo.org.*
(Continued)

*Primary Examiner* — Roger Pang
(74) *Attorney, Agent, or Firm* — WRB-IP LLP

(57) ABSTRACT

A system and a method for operating an engine of a vehicle are provided wherein a transmission coupled to the engine has a freewheeling mode. The engine is switched off by setting the transmission into the freewheeling mode and interrupting fuel supply to the engine in the freewheeling mode depending on one or more operating conditions of the vehicle. A gear in the transmission is selected proactively depending on one or more operating actions of the vehicle anticipated to be required on or within a predefined time limit after restart of the engine.

14 Claims, 4 Drawing Sheets

(51) Int. Cl.
  B60W 10/11    (2012.01)
  *F16H 61/02*      (2006.01)
  *B60W 10/10*      (2012.01)
  *B60W 30/18*      (2012.01)
  *F16H 59/58*      (2006.01)

(52) U.S. Cl.
  CPC ....... *B60Y2300/18083* (2013.01); *F16H 59/58* (2013.01); *F16H 2061/023* (2013.01); *Y10T 477/6805* (2015.01); *Y10T 477/688* (2015.01)

(56) References Cited

U.S. PATENT DOCUMENTS

| | | |
|---|---|---|
| 2007/0124037 A1 | 5/2007 | Moran |
| 2010/0286884 A1* | 11/2010 | Bunn .............................. 701/70 |
| 2011/0066338 A1* | 3/2011 | Andrasko et al. ................ 701/54 |
| 2012/0046841 A1* | 2/2012 | Wurthner et al. ............... 701/54 |

FOREIGN PATENT DOCUMENTS

| | | |
|---|---|---|
| DE | 102009028242 A1 | 2/2011 |
| DE | 102009045091 A1 | 3/2011 |
| DE | 102010003673 A1 | 10/2011 |
| WO | 2009060241 A1 | 5/2009 |
| WO | 2010121861 A1 | 10/2010 |
| WO | 2010128898 A1 | 11/2010 |

OTHER PUBLICATIONS

International Search Report (Dec. 12, 2011) for corresponding International application No. PCT/SE2011/000064.

* cited by examiner

SYSTEM AND METHOD FOR OPERATING AN ENGINE OF A VEHICLE

BACKGROUND AND SUMMARY

The invention relates to a system and a method for operating a vehicle.

WO 2009060241 A1 discloses a vehicle system including a controller which, dependent upon the measured speed of the vehicle and a path information, triggers a freewheeling mode of a gearbox. The combustion engine can be switched off in order to save fuel for all functions except the steering system and the brakes of the vehicle. By saving fuel in particular operation modes of the engine $CO_2$ emissions of the vehicle can be reduced.

DE 10 2005 003 608A1 discloses a method for operating an engine of a commercial vehicle, wherein a transmission coupled to the engine has a freewheeling mode. The engine is switched off by setting the transmission into the freewheeling mode and interrupting fuel supply to the engine in the freewheeling mode. While the freewheeling mode is enabled, the gear setting is adapted to the current speed of the vehicle.

It is desirable to provide a method for operating an engine of a vehicle which improves a $CO_2$ balance of the vehicle.

It is also desirable to provide a reliable system for performing such a method.

A method is proposed for operating an engine of a vehicle, particularly a commercial vehicle, wherein a transmission coupled to the engine has a freewheeling mode. The engine is switched off by setting the transmission into the freewheeling mode and interrupting fuel supply to the engine in the freewheeling mode depending on one or more operating conditions of the vehicle, and, while the engine is switched off, a gear in the transmission is proactively selected depending on one or more operating actions of the vehicle anticipated to be required on or within a predefined time limit after restart of the engine.

Advantageously, fuel and emissions can be saved while the necessary support functions provided by a running engine can be re-established as fast as needed. The vehicle can be operated safely and economically. The method can be performed with existing hardware in a vehicle which can easily be used or adapted—for instance by adapting the control software of the hardware—to perform the method. Particularly, the engine can be switched off when it is recognized that no steering action will be required for a predetermined time span which is sufficient to switch the vehicle off and on again. The engine can be switched off when it is recognized that support functions for which the engine is needed, such as servo steering or servo braking, for instance, will not be needed for a predetermined time span, e.g. for several ten seconds or more, typically at least 20 seconds or at least 30 seconds. All kinds of information available in the vehicle, e.g. provided by information systems and/or control systems and/or support systems and the like, can be used which allow to anticipate a coming requirement for steering or braking within a reasonable time span.

One particular operating condition may refer to the vehicle moving downhill and straight ahead and does not need engine based braking or steering support such a servo braking function or a servo steering function within a certain time span, while the transmission is being prepared in a way (by selecting a proper gear) that the engine can provide the necessary support for such functions on or within a few seconds after restart of the engine. During the freewheeling mode, the rotatable gear components of the transmission are rotating for ensuring that the transmission components are sufficiently lubricated.

The transmission can be an automated mechanical transmission, an automatic transmission or a CVT transmission (CVT=continuously variable transmission).

In another particular operating condition the vehicle may move downhill and a very shallow bend is present or anticipated by electronic maps or a navigation system or the like, so that the vehicle can move predominantly straight ahead and does not need engine based braking or steering support such a servo braking or servo steering within a certain time span, while the transmission is being prepared in a way (by selecting a proper gear) that the engine can provide the necessary support for such functions on or within a few seconds after restart of the engine. Instead of a normal servo steering support, brake steering can be used, i.e. the steering actuator (such as a steering wheel) generates slight turning movements of the steerable wheels which can brake the wheels one side of the vehicle more than on the other side so that the vehicle can follow a shallow bend. Such steering by (selectively) braking is possible at low wheel angles not more than 10°, favourably not more than 5°, at moderate steering forces.

In another particular operating condition the vehicle may move on level ground or downhill and the driver may be desirous to brake far ahead because of a coming speed limit or a parking area or a fuel refill station. The vehicle can decelerate slowly, while the transmission is being prepared in a way (by selecting a proper gear) that the engine can provide the necessary support for such functions on or within a few seconds after restart of the engine.

According to a favourable method step, in a first case when a steering action is anticipated on or after restarting the engine, a gear in the transmission may be selected generating higher engine revolutions than when no steering action is anticipated. Alternatively, in a second case when no steering action is anticipated on or after restarting the engine, a gear in the transmission may be selected generating lower engine revolutions than would have been chosen when a steering action would have been anticipated.

Normally, in a freewheeling mode, low revolutions are selected. For instance, a twelfth gear may be engaged which results in approximately 1200 rpm. Engaging the eleventh gear would result in "high" revolutions with approximately 1500 rpm. this results in a quicker availability of steering support than lower revolutions. In a critical situation where a very quick reaction of the steering would be required it would even be possible to engage the tenth gear which would result in approximately 2000 rpm.

A favourable method step may further comprise adapting the gear as a function of a vehicle speed. In case the vehicle speed changes while the engine is switched off, an appropriate gear of the transmission can be selected and prepared for a quick restart of the engine and a quick supply of servo support for components like steering and brake devices.

A favourable method step may further comprise restarting the engine when one or more conditions are fulfilled, the conditions comprising a steering action above a predetermined steering angle and/or a predetermined steering force is required actually or anticipated within a predetermined time span;

a braking action is required actually or anticipated within a predetermined time span by activating a brake actuator;

a system responsive to approaching objects detects an approaching object;

a lane detecting system of the vehicle requires a steering action or anticipates a steering action within a predetermined time span and/or spatial range ahead of the vehicle;

an air pressure in a pressurized air system is at or below an air pressure limit;

a battery charge in a battery system of the vehicle is at or below a battery charge limit.

It is of advantage to maintain the freewheeling mode of the transmission with fuel interruption as long as possible so that a reasonable value for such time spans is, for instance, a few seconds, particularly 1 to 10 seconds before an action such as braking action, steering action is started.

A safe operation of the vehicle is possible. Expediently, the engine will not be switched off when one or more of these conditions are present or anticipated within the predetermined time span.

A favourable method step may further comprise switching off the engine only when one or more conditions are fulfilled, the conditions comprising no steering action above a predetermined steering angle is required actually or anticipated within a predetermined time span;

no braking action is required actually or anticipated within a predetermined time span;

air pressure in a pressurized air system is available above a air pressure limit;

a battery charge in a battery system of the vehicle is above a battery charge limit, thus ensuring the safe operation of the vehicle.

It is of advantage to maintain the freewheeling mode of the transmission with fuel interruption as long as possible so that a reasonable value for such time spans is, for instance, a few seconds, particularly 1 to 10 seconds before an action such as braking action, steering action is started.

A favourable method step may further comprise prohibiting switching off of the engine in case a lane detecting system of the vehicle requires a steering action within a predetermined time limit and/or spatial range ahead of the vehicle. For instance, information provided by an adaptive cruise control system can be used.

A favourable method step may further comprise restarting the engine in case a steering angle is anticipated of at least 5°, preferably of at least 10° on or after restart of the engine. Expediently, a driver may prefer servo steering support for larger steering angles.

According to another aspect of the invention, a control system is proposed for operating an engine of a vehicle, particularly a commercial vehicle by employing a method as described above, wherein means are provided for switching off the engine by setting the transmission into the freewheeling mode and interrupting fuel supply to the engine in the freewheeling mode depending on one or more operating conditions of the vehicle;

selecting a gear in the transmission proactively depending on one or more operating actions of the vehicle anticipated to be required on or within a predefined time limit after restart of the engine.

Expediently, the means may include a control unit which triggers switching off and on the engine and selecting a proper gear depending on the operating conditions and operating actions, respectively.

According to a favourable embodiment, the means may be coupled to a system responsive to approaching objects. For instance a driver assistance system which warns a driver in case obstacles are approaching the vehicle or vice versa can be used, for instance radar or lidar based systems which are looking ahead of the vehicle.

According to a favourable embodiment, the means may be coupled to a lane detecting system of the vehicle. Expediently, a lane detecting system can easily provide information of the kind of road ahead of the vehicle and can particularly detect whether the vehicle is approaching a bend, a junction or the like.

According to a favourable embodiment, the means may be responsive to a steering angle a and/or a steering force SF and/or a braking force BF.

According to another aspect of the invention, a vehicle is proposed, particularly a commercial vehicle, comprising a control system as described above. The vehicle allows to drive in an economic and safe way.

According to another aspect of the invention, a computer program comprising a computer program code adapted to perform a method or for use in a method as described above when said program is run on a programmable microcomputer. The computer program can be loaded to an appropriate read- and/or write memory of a control unit which triggers switching the engine off and initiating the freewheeling mode of the transmission when certain operating conditions of the vehicle are present. The computer program can be loaded into the control unit by attaching a disk, a USB stick, a CD, a DVD or any other appropriate data carrier. Expediently, the computer program may be adapted to be downloadable to the control unit or one of its components when run on a computer which is connected to the internet. In this case the computer program can be loaded to the control unit remotely.

According to another aspect of the invention, a computer program product stored on a computer readable medium, comprising a program code for use in a method as described above in a computer. The computer readable medium may be any kind of appropriate data carrier.

BRIEF DESCRIPTION OF THE DRAWINGS

The present invention together with the above-mentioned and other objects and advantages may best be understood from the following detailed description of the embodiments, but not restricted to the embodiments, wherein is shown schematically.

DETAILED DESCRIPTION

Figure 1:
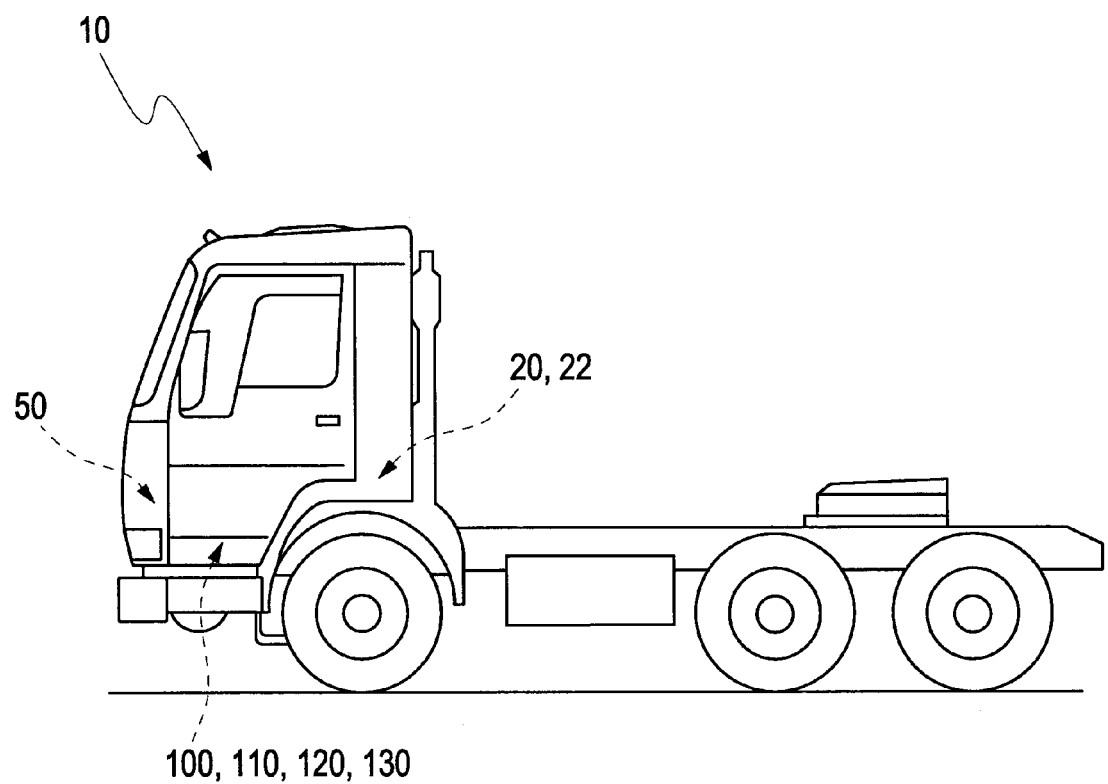
FIG. 1 an example embodiment of a vehicle where a control unit is installed according to the invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

FIG. 1 depicts schematically an example embodiment of a vehicle 10 embodied as a tractor vehicle where a control system with a control unit 50 is installed which can trigger switching off the vehicle's engine 20 and setting a transmission 22 coupled to the engine 20 to a freewheeling mode. The transmission may preferably be an automated mechanical transmission.

For instance, the vehicle 10 can be a truck, a tractor-trailer combination, a tractor-semitrailer combination.

According to the method, the engine 20 is switched off by setting the transmission 22 into the freewheeling mode and interrupting fuel supply to the engine 20 in the freewheeling mode depending on one or more operating parameters of the vehicle 10. While the engine 20 is switched off, a gear is selected in the transmission 22 proactively depending on one or more operating actions of the vehicle 10 anticipated to be required on or within a predefined time span after restart of the engine 20.

For being able to anticipate a requirement in the future, the control unit 50 is favourably coupled to control devices of driver support and/or warning systems installed in the vehicle 10. For instance, the control unit 50 may be coupled to a driver assistance system 100 which warns the driver when an obstacle is approached by the vehicle 10, a lane detection system 110 such as an ACC system (ACC=Adaptive Cruise Control). Further it is expedient to couple the control unit 50 to an air pressure control system 120 of the vehicle 10 such as an air suspension, as well as a battery control system 130 of the vehicle 10. In the latter two cases it can be ensured that the air suspension of the vehicle 10 as well as the battery of the vehicle 10 is operative.

Figure 2:
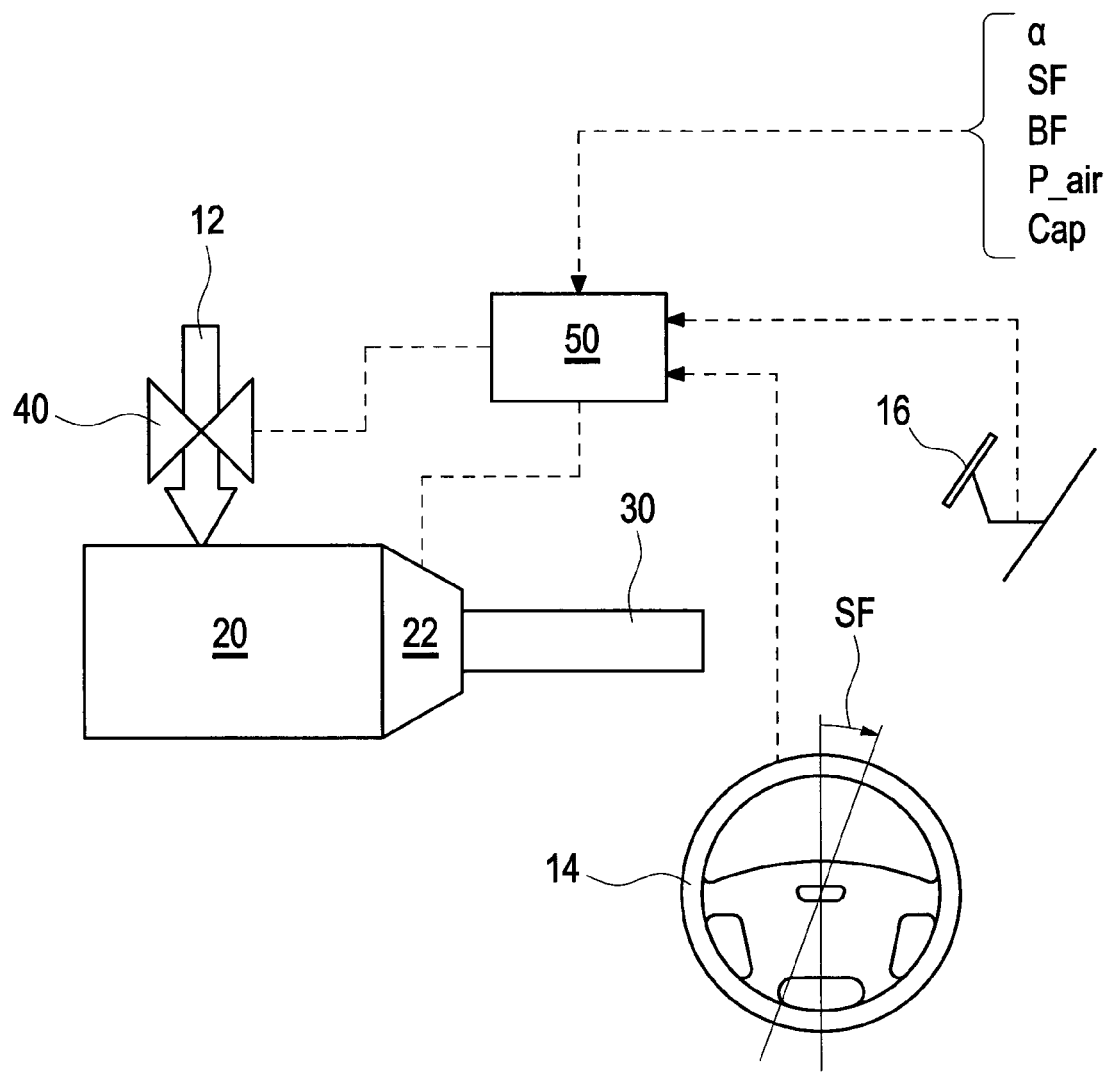
FIG. 2 a schematic sketch of an example embodiment of an engine—transmission compound coupled to a control unit for switching off and on the engine while selecting an appropriate gear in the transmission.

FIG. 2 displays a schematic sketch of an example embodiment of an engine-transmission compound coupled to a control unit 50 for switching off and on the engine 20 while selecting an appropriate gear in the transmission 22. In the freewheeling mode an output shaft 30 of the engine-transmission compound is decoupled from the engine 20.

The control unit 50 can trigger an interruption of a fuel supply 12 to the engine 20, e.g. by closing a valve 40 as well as trigger the freewheeling mode in the transmission 22 and selecting a proper gear in the transmission for a restart, e.g. by communicating with a transmission controller (not shown). Alternatively, the fuel supply 12 can be interrupted by keeping fuel injectors closed which are provided for injecting fuel into the engine.

The control unit 50 receives an input of various operation parameters of the vehicle 10 as well as information from vehicular control systems 100, 110, 120, 130.

In a first case when a steering action is anticipated on or after restarting the engine 20, a gear in the transmission 22 generating higher engine revolutions than with an engine idle mode when the engine 20 is not in the freewheeling mode.

In a second case when no steering action is anticipated on or after restarting the engine 20, a gear is selected in the transmission 22 generating lower engine revolutions than would have been chosen when a steering action would have been anticipated.

In every case it is advantageous to adapt the gear as a function of a vehicle speed. Thus, when a proper gear is selected shortly after the engine 20 is switched off and the transmission 22 is freewheeling, a change in the vehicle speed before the engine 20 is switched on and the transmission 22 engaged again may be compensated by a gear change so that the engine 20 can operate with the transmission 22 in the proper gear. When a steering support is required, the transmission 22 is prepared with the right gear to provide high engine revolutions so that a steering force is quickly available for servo steering (first case). When a brake actuator 16 such as a brake pedal is engaged or braking is anticipated, a higher gear is selected to provide a more economic fuel consumption. In this latter case, a high torque is not required Restarting the engine 20 can be done when a steering action of a steering actuator 14 such as a steering wheel above a predetermined steering angle a of steerable vehicle wheels and/or a predetermined steering force SF exerted by the steering actuator 14 is required actually or anticipated within a predetermined time span; and/or a braking action is required actually or anticipated within a predetermined time limit by activating a brake actuator 16; and/or the system 100 responsive to approaching objects detects an approaching object; and/or the lane detection system 110 of the vehicle 10 requires a steering action within a predetermined time limit and/or spatial range ahead of the vehicle 10; and/or an air pressure P air in a pressurized air system 120 is at or below a air pressure limit; and/or a battery charge (battery charge called CAP in the drawing) in a battery system 130 of the vehicle 10 is at or below a battery charge limit.

Switching off the engine 20 is done only when no steering action above a predetermined steering angle is required actually or anticipated within a predetermined time limit, and/or no braking action is required actually or anticipated within a predetermined time limit and/or the air pressure P in a pressurized air system 120 is available above a air pressure limit, and/or a battery charge in a battery system 120 of the vehicle 10 is above a battery charge limit. Thus, the vehicle 10 can be operated safely.

Switching off of the engine 20 is expediently also prohibited in case a lane detection system 110 requires a steering action within a predetermined time limit and/or spatial range ahead of the vehicle 10.

The engine 20 can be restarted and the transmission 22 engaged in the properly selected gear in case a steering angle a, i.e. the deviation of the steerable wheels from their position when driving straight ahead, is anticipated of at least 5°, preferably of at least 10° on or after restart of the engine 20.

Figure 3:
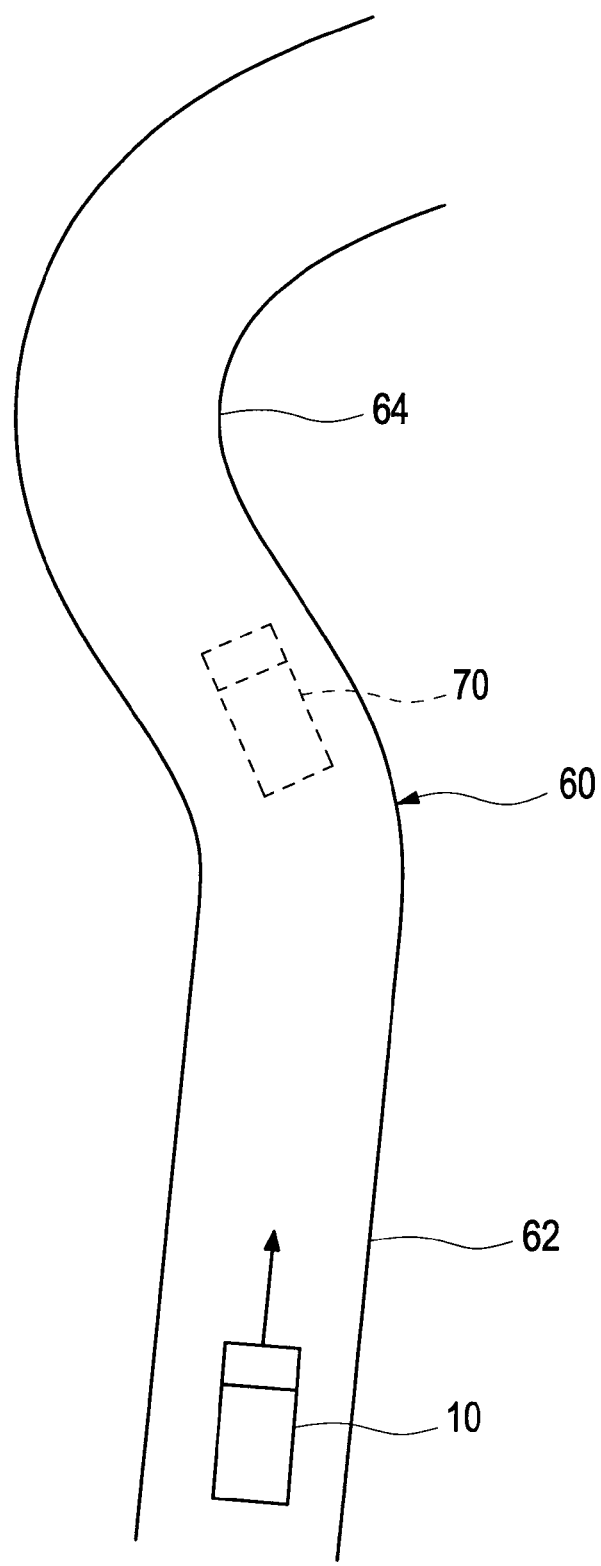
FIG. 3 a sketch of a vehicle on a road with another vehicle and a bend ahead of the vehicle.

FIG. 3 depicts a driving condition of the vehicle 10 of FIG. 2 moving downhill in a road 60 on a straight portion 62 of the road 60. A lane detection system 120 (FIG. 1) has recognized that the road has a straight portion 62 and that neither a steering action nor a braking action is required or will be required for some time. The transmission 22 is set to its freewheeling mode and the engine 20 (FIG. 1, 2) is switched off by cutting the fuel supply. A driver assistance system detects an object 70 ahead of the vehicle and a navigation system informs the vehicle 10 that a bend 64 is approached by the vehicle 10. A gear is selected in the transmission for preparing a steering action of the vehicle, i.e. the selected gear generates high revolutions of the engine and a servo steering support is available quickly after restarting the engine 20 well ahead of the bend 64 for safely steering the vehicle 10 along the bend.

In case an obstacle or object 70 (indicated by a dashed rectangle) would be detected ahead of the vehicle e.g. by a radar based warning system, the gear is selected in the transmission 22 for preparing a braking action of the vehicle, i.e. the selected gear generates low revolutions for economic fuel consumption.

Figure 4:
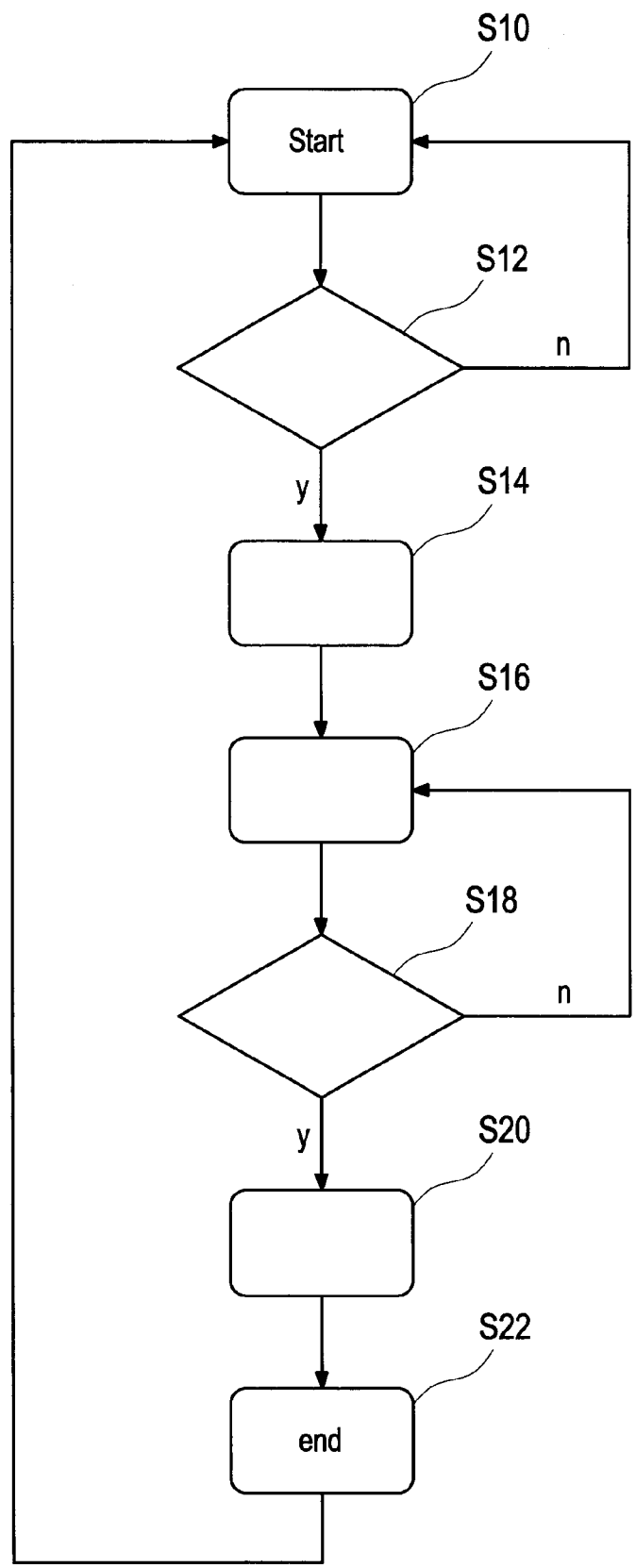
FIG. 4 a flow chart illustrating an example embodiment of a method for operating a vehicle according to the invention.

FIG. 4 illustrates a flow chart describing a possible procedure for operating the vehicle 10. The procedure starts at step S10. This may be e.g. at the start of the vehicle 10 or by a manual selection of the operation mode by the driver. In step S12 it is checked whether actual driving conditions of the vehicle 10 allow switching off the engine 20 (FIG. 2). If the driving conditions prohibit switching off the engine 20 ("n" in the flow chart) the procedure jumps back to step S10. Such a driving condition may be an actual or anticipated steering action, an actual or anticipated braking action, a low battery charge, a low air pressure in the air suspension, or the like.

If the driving conditions permit to switch off the engine 20 (FIG. 2) ("y" in the flow chart) the procedure continues with step S14. In step S 14 the transmission 22 (FIG. 2) is set in its freewheeling mode and the fuel supply to the engine 20 is stopped. Optionally a gear in the transmission 22 may already be set for providing high revolutions on a restart of the engine 20 as a fail safe measure.

In step S16 the control unit 50 (FIG. 2) collects information or receives information which reveals the current driving state of the vehicle 10 (FIG. 1), the vehicle speed as well as anticipated driving actions of the vehicle 10 (FIG. 1, FIG. 3) some time ahead. In step S18 it is checked whether or not a restart of the vehicle 10 (FIG. 1) is required. If a restart is required ("y" in the flow chart), the procedure continues with step S20. If no restart is required ("n" in the flow chart), the procedure jumps back to step S16.

If a restart of the engine 20 is required ("y" in the flow chart) the procedure continues with step S20. In step S20 a proper gear is chosen and optionally adapted to a speed change which might have occurred during the time the engine 20 was switched off. The engine 20 (FIG. 2) is supplied with fuel again and the transmission 22 (FIG. 2) leaves its freewheeling mode with the selected gear. The procedure ends in step S22.

The invention claimed is:

1. A method for operating an engine of a vehicle, wherein a transmission coupled to the engine has a freewheeling mode, comprising
   switching off the engine by setting the transmission into the freewheeling mode and interrupting fuel supply to the engine in the freewheeling mode depending on one or more operating conditions of the vehicle;
   selecting a gear in the transmission proactively depending on one or more operating actions of the vehicle anticipated to be required on or within a predefined time limit after restart of the engine, wherein
   in a first case, when a steering action is anticipated on or after restarting the engine, selecting a gear in the transmission generating higher engine revolutions than when no steering action is anticipated, or
   in a second case, when no steering action is anticipated on or after restarting the engine, selecting a gear in the transmission generating lower engine revolutions than would have been chosen when a steering action would have been anticipated.

2. The method according to claim 1, comprising adapting the gear as a function of a vehicle speed.

3. The method according to claim 1, comprising restarting the engine when one or more conditions are fulfilled, the conditions comprising
   a steering action above a predetermined steering angle and/or a predetermined steering force is required actually or within a predetermined time limit;
   a braking action is required actually or within a predetermined time limit by activating a brake actuator;
   a system responsive to approaching objects detects an approaching object;
   a lane detecting system of the vehicle requires a steering action within a predetermined time limit and/or spatial range ahead of the vehicle;
   an air pressure in a pressurized air system is at or below a air pressure limit;
   a battery charge in a battery system of the vehicle is at or below a battery charge limit.

4. The method according to claim 1, comprising switching off the engine only when one or more conditions are fulfilled, the conditions comprising
   no steering action above a predetermined steering angle is required actually or within a predetermined time limit;
   no braking action is required actually or within a predetermined time limit;
   air pressure in a pressurized air system is available above a air pressure limit;
   a battery charge in a battery system of the vehicle is above a battery charge limit.

5. The method according to claim 1, comprising prohibiting switching off of the engine in case a lane detecting system of the vehicle requires a steering action within a predetermined time limit and/or spatial range ahead of the vehicle.

6. The method according to claim 1, comprising restarting the engine in case a steering angle is anticipated of at least 5° on or after restart of the engine.

7. A tangible, computer readable medium comprising a computer program code adapted to perform a method or for use in a method according to claim 1.

8. The tangible, computer readable medium according to claim 7, the tangible medium being constructed such that the computer code is adapted to be downloadable to a control unit or one of its components.

9. Computer program product stored on a computer readable medium, comprising a program code for use in a method according to claim 1.

10. A control system for operating an engine of a vehicle, wherein a transmission coupled to the engine has a freewheeling mode, the control system being arranged for
    switching off the engine by setting the transmission into the freewheeling mode and interrupting fuel supply to the engine in the freewheeling mode depending on one or more operating conditions of the vehicle;
characterized by
    selecting a gear in the transmission proactively depending on one or more operating actions of the vehicle anticipated to be required on or within a predefined time limit after restart of the engine, wherein
    in a first case, when a steering action is anticipated on or after restarting the engine, selecting a gear in the transmission generating higher engine revolutions than when no steering action is anticipated, or
    in a second case, when no steering action is anticipated on or after restarting the engine, selecting a gear in the transmission generating lower engine revolutions than would have been chosen when a steering action would have been anticipated.

11. The system according to claim 10, wherein the control system is coupled to a system responsive to approaching objects.

12. The system according to claim 10, wherein the control system is coupled to a lane detecting system of the vehicle.

13. The system according to claim 10, wherein the control system is responsive to a steering angle and/or a steering force and/or a braking force.

14. A vehicle, particularly a commercial vehicle, comprising a control system according to claim 10.

* * * * *